US012609326B2

(12) United States Patent
Fathi Tovini et al.

(10) Patent No.: US 12,609,326 B2
(45) Date of Patent: Apr. 21, 2026

(54) OXYGEN EVOLUTION CATALYST, PRODUCTION AND USE OF SAME, MEMBRANE ELECTRODE ARRANGEMENT AND FUEL CELL OR ELECTROLYTIC CELL

(71) Applicants:Greenerity GmbH, Alzenau (DE); Technische Universität München, Munich (DE)

(72) Inventors: Mohammad Fathi Tovini, Munich (DE); Hany Elsayed, Neufahrn (DE); Ana Marija Damjanovic, Munich (DE); Hubert Gasteiger, Munich (DE); Jozsef Speder, Frankfurt am Main (DE); Alessandro Ghielmi, Frankfurt am Main (DE); Jens-Peter Suchsland, Alzenau (DE)

(73) Assignees: Greenerity GmbH, Alzenau (DE); Technische Universität München, Munich (DE)

( * ) Notice: Subject to any disclaimer, the term of this patent is extended or adjusted under 35 U.S.C. 154(b) by 520 days.

(21) Appl. No.: 18/031,308

(22) PCT Filed: Oct. 7, 2021

(86) PCT No.: PCT/EP2021/077750
§ 371 (c)(1),
(2) Date: Apr. 11, 2023

(87) PCT Pub. No.: WO2022/078873
PCT Pub. Date: Apr. 21, 2022

(65) Prior Publication Data
US 2023/0387423 A1      Nov. 30, 2023

(30) Foreign Application Priority Data
Oct. 13, 2020     (DE) ..................... 10 2020 126 796.7

(51) Int. Cl.
*H01M 4/92* (2006.01)
*C25B 11/054* (2021.01)
(Continued)

(52) U.S. Cl.
CPC ........... *H01M 4/926* (2013.01); *C25B 11/054* (2021.01); *C25B 11/065* (2021.01);
(Continued)

(58) Field of Classification Search
CPC . B01J 21/18; B01J 23/468; B01J 23/42; B01J 35/30; B01J 35/33; B01J 35/613;
(Continued)

(56) References Cited

U.S. PATENT DOCUMENTS

| | | | | |
|---|---|---|---|---|
| 6,936,370 B1 * | 8/2005 | Knights | .............. | H01M 4/8605 |
| | | | | 429/492 |
| 2009/0068541 A1 * | 3/2009 | Yan | ..................... | H01M 4/8828 |
| | | | | 502/101 |

(Continued)

FOREIGN PATENT DOCUMENTS

| | | | |
|---|---|---|---|
| CA | 2984036 A1 * | 1/2018 | ......... H01M 4/9075 |
| CN | 101087022 | 12/2007 | |

(Continued)

OTHER PUBLICATIONS

Tsutomu Ioroi et al., "Iridium Oxide/Platinum Electrocatalysts for Unitized Regenerative Polymer Electrolyte Fuel Cells." Journal of The Electrochemical Society 147 (6), pp. 2018-2022. (Year: 2000).*

(Continued)

*Primary Examiner* — Patricia L. Hailey
(74) *Attorney, Agent, or Firm* — DLA Piper LLP (US)

(57) ABSTRACT

An oxygen evolution reaction catalyst includes iridium oxide that exhibits a weight loss of less than 1% by weight upon exposure of the oxygen evolution reaction catalyst to a 3.3 vol % hydrogen stream in argon at a temperature of 80°

(Continued)

Route A

Route B

C. for 12 hours and has a BET specific surface area of more than 15 m²/g.

11 Claims, 5 Drawing Sheets

(51) Int. Cl.

| | | |
|---|---|---|
| *C25B 11/065* | (2021.01) | |
| *C25B 11/075* | (2021.01) | |
| *H01M 4/90* | (2006.01) | |
| *H01M 8/10* | (2016.01) | |

(52) U.S. Cl.
CPC ......... *C25B 11/075* (2021.01); *H01M 4/9083* (2013.01); *H01M 2008/1095* (2013.01)

(58) Field of Classification Search
CPC ...... B01J 35/615; B01J 35/617; B01J 35/618; B01J 37/08; B01J 37/0036; B01J 37/088; H01M 4/926; H01M 4/9083; H01M 2008/1095; C25B 11/065; C25B 11/054; C25B 11/075
USPC ............ 429/483; 502/101, 185, 325; 241/23
See application file for complete search history.

(56) References Cited

U.S. PATENT DOCUMENTS

| | | | |
|---|---|---|---|
| 2014/0349203 | A1 | 11/2014 | Klose-Schubert et al. |
| 2015/0072269 | A1 | 3/2015 | Lee |
| 2017/0233879 | A1 | 8/2017 | Kumta et al. |
| 2017/0244109 | A1 | 8/2017 | O'Malley et al. |
| 2020/0290020 | A1 | 9/2020 | Massué et al. |
| 2020/0321622 | A1* | 10/2020 | Sharman ............. H01M 4/8828 |
| 2021/0167401 | A1* | 6/2021 | Kitao ................... C25B 11/065 |
| 2022/0259750 | A1* | 8/2022 | Kemmer .............. H01M 4/925 |

FOREIGN PATENT DOCUMENTS

| | | | | | |
|---|---|---|---|---|---|
| CN | 106410329 | A | * | 2/2017 | ............ H01M 12/06 |
| CN | 109126780 | A | * | 1/2019 | ............ C25B 11/04 |
| CN | 117334931 | A | * | 1/2024 | ............ H01M 4/88 |
| DE | 10 2013 225 344 | A1 | | 3/2015 | |
| EP | 2 475 034 | A1 | | 7/2012 | |
| EP | 2 608 298 | A1 | | 6/2013 | |
| JP | 2017-533084 | | | 11/2017 | |
| KR | 1020140135306 | A | | 11/2014 | |
| KR | 20160038301 | A | * | 4/2016 | ............ B01J 23/42 |
| WO | 2005/049199 | A1 | | 6/2005 | |

OTHER PUBLICATIONS

T. Ioroi et al., "IrO2-deposited Pt electrocatalysts for unitized regenerative polymer electrolyte fuel cells." Journal of Applied Electrochemistry 31, pp. 1179-1183. (Year: 2001).*

English translation of Written Opinion for PCT/EP2021/077750. (Year: 2022).*

Office Action dated Nov. 7, 2023, of counterpart Japanese Patent Application No. 2023-522561, along with an English translation.

Simon Geiger et al., "Activity and Stability of Electrochemically and Thermally Treated Iridium for the Oxygen Evolution Reaction," Journal of the Electrochemical Society, vol. 163, No. 11, pp. F3132-F3138 (2016).

International Search Report dated Jan. 13, 2022 in counterpart International Application No. PCT/EP2021/077750 w/English translation.

Written Opinion dated Jan. 13, 2022 in counterpart International Application No. PCT/EP2021/077750.

Office Action dated May 7, 2024, from counterpart Japanese Patent Application No. 2023522561.

Decision of Patent dated Nov. 12, 2024, from counterpart Japanese Patent Application No. 2023522561.

* cited by examiner

OXYGEN EVOLUTION CATALYST, PRODUCTION AND USE OF SAME, MEMBRANE ELECTRODE ARRANGEMENT AND FUEL CELL OR ELECTROLYTIC CELL

TECHNICAL FIELD

This disclosure relates to an oxygen evolution reaction catalyst, the production and use thereof and a membrane electrode assembly, a fuel cell and an electrolysis cell containing this oxygen evolution reaction catalyst.

BACKGROUND

During operation of a fuel cell an insufficient amount of fuel coupled with simultaneous demand of a certain current can result in high potentials of, for example, 1.4 V or more occurring on the anode of a membrane electrode assembly (MEA), thus reversing the voltage of the fuel cell. This phenomenon is commonly referred to as "fuel starvation" or "cell reversal." Under those high potentials the carbon typically used in the anodes as support material for catalysts oxidizes (corrodes) and the MEA degrades.

It is also known that a carbon oxidation reaction (COR) during fuel starvation can be avoided in the anode by addition of oxygen evolution reaction catalysts (OER catalyst) since this ensures that during fuel starvation oxygen evolution from water is favored over carbon oxidation. Iridium dioxide ($IrO_2$) and ruthenium dioxide ($RuO_2$) are currently considered to be the best OER catalysts in acidic media. However, a disadvantage of $IrO_2$ and $RuO_2$ is that these can easily be reduced to metallic iridium and metallic ruthenium under the conditions of the anode of a fuel cell since the reduction of these noble metal oxides by hydrogen can occur spontaneously at the operating temperature of the fuel cell. The operating temperature is typically 80° C. Dissolution of metallic iridium and ruthenium to form cationic compounds can also occur. Accordingly the use of OER catalysts to avoid COR in fuel cells can lead to dissolution of the OER catalyst and thus to ionic contamination of the membrane and the cathode catalyst layer especially under startup/shutdown (SUSD) operating conditions and to fuel starvation, thus resulting in a reduction in the power density of the MEA. This reduction in power density is attributable to the reduction of $IrO_2$ and $RuO_2$ by hydrogen.

To improve the stability of $IrO_2$, (see, for example, Simon Geiger et al.: "Activity and Stability of Electrochemically and Thermally Treated Iridium for the Oxygen Evolution Reaction," Journal of The Electrochemical Society, 163 (11), F3132-F3138 (2016) discloses thermal treatments, for example, sintering. But sintering at high temperatures leads to agglomeration of iridium particles which therefore suffer a loss of catalytically active surface area. Accordingly, the catalytic activity of the OER catalyst decreases since the activity of the catalyst is proportional to the specific surface area thereof. However, OER catalysts that are heat treated at temperatures of 500° C. or below do not exhibit sufficient reduction stability and therefore dissolve in the course of repeated potential cycles, thus losing OER activity and liberating iridium compounds which contaminate an MEA, thus leading to performance losses of a fuel cell or electrolysis cell.

It could therefore be helpful to provide an oxygen evolution reaction catalyst featuring very good stability towards reduction by hydrogen coupled with high catalytic activity, a process of producing, and a use of, the oxygen evolution reaction catalyst, a membrane electrode assembly, a fuel cell and an electrolysis cell containing this oxygen evolution reaction catalyst, wherein the MEA, the fuel cell and the electrolysis cell feature enduringly high power density even in fuel starvation or under startup/shutdown conditions.

SUMMARY

We provide an oxygen evolution reaction catalyst including iridium oxide that exhibits a weight loss of less than 1% by weight upon exposure of the oxygen evolution reaction catalyst to a 3.3 vol % hydrogen stream in argon at a temperature of 80° C. for 12 hours and has a BET specific surface area of more than 15 $m^2$/g.

We also provide an anode for a fuel cell including an oxygen evolution reaction catalyst, wherein the oxygen evolution reaction catalyst includes iridium oxide and exhibits a weight loss of less than 1% by weight upon exposure of the oxygen evolution reaction catalyst to a 3.3 vol % hydrogen stream in argon at a temperature of 80° C. for 12 hours.

We further provide an anode for an electrochemical cell including an oxygen evolution reaction catalyst including iridium oxide that exhibits a weight loss of less than 1% by weight upon exposure of the oxygen evolution reaction catalyst to a 3.3 vol % hydrogen stream in argon at a temperature of 80° C. for 12 hours and has a BET specific surface area of more than 15 $m^2$/g.

We further yet provide a membrane electrode assembly including an anode for a fuel cell including an oxygen evolution reaction catalyst, wherein the oxygen evolution reaction catalyst includes iridium oxide and exhibits a weight loss of less than 1% by weight upon exposure of the oxygen evolution reaction catalyst to a 3.3 vol % hydrogen stream in argon at a temperature of 80° C. for 12 hours.

We also further provide a water electrolysis cell including the anode for an electrochemical cell including the oxygen evolution reaction catalyst including iridium oxide that exhibits a weight loss of less than 1% by weight upon exposure of the oxygen evolution reaction catalyst to a 3.3 vol % hydrogen stream in argon at a temperature of 80° C. for 12 hours and has a BET specific surface area of more than 15 $m^2$/g.

We also further provide a fuel cell including the anode for a fuel cell including an oxygen evolution reaction catalyst, wherein the oxygen evolution reaction catalyst includes iridium oxide and exhibits a weight loss of less than 1% by weight upon exposure of the oxygen evolution reaction catalyst to a 3.3 vol % hydrogen stream in argon at a temperature of 80° C. for 12 hours.

We also further provide a process of producing the oxygen evolution reaction catalyst including iridium oxide that exhibits a weight loss of less than 1% by weight upon exposure of the oxygen evolution reaction catalyst to a 3.3 vol % hydrogen stream in argon at a temperature of 80° C. for 12 hours and has a BET specific surface area of more than 15 $m^2$/g, including a) heat treating at least one iridium compound precursor at a temperature of at least 650° C. in the presence of oxygen or an oxygen source to obtain an iridium oxide-containing compound, b) grinding the iridium oxide-containing compound, and c) heat treating the ground iridium oxide-containing compound at a temperature of 250° C. to 500° C.

LIST OF REFERENCE NUMERALS

Figure 1:
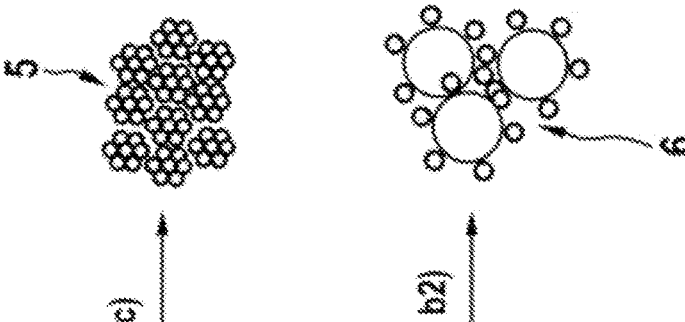
FIG. 1 shows a process of producing iridium-based OER catalysts.
Figure 1:
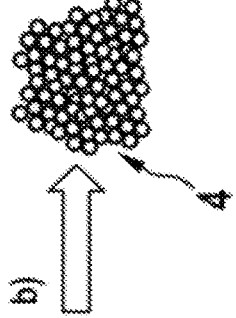
Figure 1:
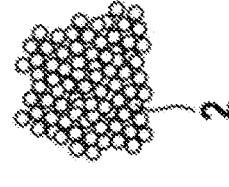
Figure 1:
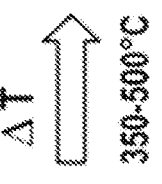
Figure 1:
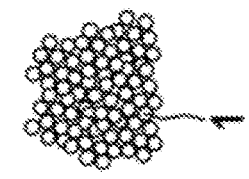
Figure 1:
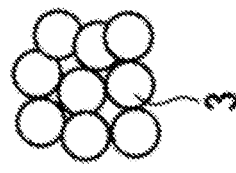
Figure 1:
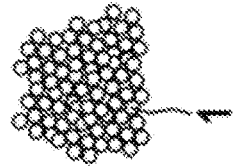

1 Iridium compound precursor
2 OER catalyst
3 IrO$_2$ crystallites
4 Ground IrO$_2$ particles
5 OER catalyst
6 IrO$_2$ particle supported on a support material
7 OER catalyst
a), b), b2), c) Process steps

DETAILED DESCRIPTION

Our oxygen evolution reaction catalyst comprises iridium oxide, wherein the oxygen evolution reaction catalyst exhibits a weight loss of less than 1% by weight upon exposure of the oxygen evolution reaction catalyst to a 3.3 vol % hydrogen stream in argon at a temperature of 80° C. for 12 hours and has a BET specific surface area of more than 15 m$^2$/g. The specific surface area is determined by nitrogen adsorption (BET method). In other words, the OER catalyst has the features that it comprises iridium oxide and has a high stability towards reduction in a water-containing atmosphere and a high specific surface area (BET surface area) and thus very good catalytic properties. The upper limit of the BET-specific surface area of the oxygen evolution reaction catalyst is not specifically limited but is preferably not more than 150 m$^2$/g for reasons of simplified production of such a surface area. The catalyst retains its OER activity during use, for example, in a fuel cell anode even under potential cycles such as those occurring during startup/shutdown events on account of its stability in a reductive environment. On account of this property the good OER activity of the iridium catalyst remains unchanged and the fuel cell is efficiently protected from carbon corrosion during undesired cell reversal events.

The reduction stability of the catalyst is determined by measuring the mass loss/weight loss of the OER catalyst under the influence of a hydrogen flow at elevated temperature. To this end a thermogravimetric analysis (TGA) is carried out in a reductive atmosphere. The thermogravimetric analysis of the OER catalyst powder is performed using a Mettler Toledo TGA/DSC 1 apparatus. About 10 to 12 mg of the OER catalyst powder are placed in a corundum crucible (volume: 70 μL) and sealed with a perforated corundum lid and placed directly in the TGA furnace. All gases used in the thermogravimetric analysis are of 5.0 purity and obtainable from Westfalen AG. Argon (20 mLmin$^{-1}$) is used as a cell carrier gas in addition to hydrogen.

Each TGA measurement is divided into steps:
i) in-situ drying step in oxidizing atmosphere, and
ii) metal oxide reduction step in reducing atmosphere.

The in-situ drying step is used to desorb all water molecules and organic molecules adsorbed on the surface of the OER catalyst powder to ensure that the weight loss in step ii) is due only to the reduction of iridium oxide.

The in-situ drying step is performed as follows: initially the TGA furnace is purged with argon for 5 min at a temperature of 25° C. (100 mLmin$^{-1}$), subsequently the temperature is increased from 25° C. to 200° C. (10 Kmin$^{-1}$) in O$_2$ (100 mLmin$^{-1}$). The temperature of 200° C. is held for 10 min in O$_2$ (100 mLmin$^{-1}$). The furnace is then cooled from 200° C. to 25° C. (–10 Kmin$^{-1}$) in O$_2$ (100 mLmin$^{-1}$) and finally the TGA furnace is purged with argon (100 mLmin$^{-1}$) for 5 min at 25° C.

The metal oxide reduction step is performed according to two different modes: a) a temperature ramp mode and b) an isothermal mode.

When performing the step in temperature ramp mode the temperature of the furnace is increased from 25° C. to 500° C. at a heating rate of 5 Kmin$^{-1}$ in 3.3 vol % H$_2$/Ar (40 mLmin$^{-1}$) followed by a cooling of the furnace from 500° C. to 25° C. (cooling rate: –20 Kmin$^{-1}$) in argon (100 mLmin$^{-1}$).

When performing the step in the isothermal mode the furnace is heated from 25° C. to 80° C. at a heating rate of 5 Kmin$^{-1}$ in argon (100 mLmin$^{-1}$) followed by gas switchover to 3.3 vol % H$_2$/Ar (40 mLmin$^{-1}$) and held at 80° C. for 12 hours. Thereafter, the furnace is cooled from 80° C. to 25° C. (cooling rate: –20 km$^{-1}$) in Ar (100 mLmin$^{-1}$).

To determine the reduction stability of the OER catalyst, the metal oxide reduction step according to b), i.e., the isothermal mode, is performed. A temperature ramp mode (temperature ramp experiment) giving the same results can be used to confirm the obtained results according to the isothermal mode.

The "BET specific surface area of the OER catalyst" means that the BET specific surface area of the material of the OER catalyst. Any support materials are not taken into account here. In other words, the BET specific surface area refers to the iridium oxide present in the OER catalyst and is expressed in m$^2_{iridium\ oxide}$/g$_{iridium\ oxide}$. The BET surface area is determined using a Quantachrome Autosorb iQ instrument. The samples are degassed overnight at 120° C. and the N$_2$-Adsorption is measured at 77 K. The specific surface area (BET specific surface area) is determined according to Brunauer-Emmett-Teller (BET) theory using "micropore BET assistant" such as the software AsiQwin.

An extraordinarily high reduction stability is achieved through a weight loss of less than 1% by weight according to the abovementioned methods and a good catalytic activity is obtained due to the simultaneously high BET specific surface area of more than 15 m$^2$/g.

Due to the very good reduction stability of the OER catalyst, the iridium of the OER catalyst is not reduced to metallic iridium during and accordingly shows no dissolution or conversion into contaminating iridium compounds during startup/shutdown cycles and/or cell reversal conditions. This stability has two consequences: on the one hand, the OER activity is retained during operation of an electrochemical cell, thus retaining a cell reversal tolerance over the complete lifetime of an MEA and, on the other hand, the reduction stability prevents formation of metallic iridium and consequent formation of iridium ions which can contaminate the MEA, thus retaining enduringly good power density.

Simultaneously, the very high BET specific surface area of the OER catalyst ensures a sufficiently high OER activity of the catalyst, wherein the OER activity prevents carbon corrosion due to high potentials that occur in cell reversal during fuel starvation.

Advantageously, we provide that the oxygen evolution reaction catalyst is supported on a support material to stabilize the BET specific surface area to thus obtain the highest possible catalytic activity. Supporting the OER catalyst prevents agglomeration thereof. Suitable support materials especially include electrically conductive support material such as in particular carbon-based support materials including especially graphitized carbon or acetylene-based carbon.

We also provide a first anode for a fuel cell comprising an oxygen evolution reaction catalyst comprising iridium oxide, wherein the oxygen evolution reaction catalyst exhibits a weight loss of less than 1% by weight upon exposure of the oxygen evolution reaction catalyst to a 3.3 vol % hydrogen stream in argon at a temperature of 80° C. for 12 hours.

Also included is a second anode comprising an OER catalyst, wherein the OER catalyst comprises iridium oxide, wherein the oxygen evolution reaction catalyst exhibits a weight loss of less than 1% by weight upon exposure of the oxygen evolution reaction catalyst to a 3.3 vol % hydrogen stream in argon at a temperature of 80° C. for 12 hours and has a BET specific surface area of more than 15 m²/g.

Due to the use of the respective OER catalyst the first and the second anode also feature very good stability and very good tolerance to cell reversal in fuel starvation and also high degradation stability under startup/shutdown conditions.

Advantageously, in particular, if the anode is used as an anode of a fuel cell, the anode advantageously comprises at least one hydrogen oxidation catalyst. The hydrogen oxidation catalyst is preferably a platinum-based hydrogen oxidation catalyst that exhibits very good corrosion resistance on account of its noble metal character.

The OER catalyst may be present in the anode in supported or unsupported form. This also applies to the hydrogen oxidation catalyst. Further advantageously, the hydrogen oxidation catalyst is supported on a support material and/or on the oxygen evolution reaction catalyst. In a first example, this means that both the hydrogen oxidation catalyst and the OER catalyst are arranged on a support material such as in particular a carbon-based support material and especially graphitized carbon. The respective carrier materials may be the same or different. The OER catalyst and the hydrogen oxidation catalyst are preferably supported on the same support material. To this end an OER catalyst may, for example, be supported on a support material and subsequently blended with a hydrogen oxidation catalyst. This may result in the hydrogen oxidation catalyst being preferentially deposited on the OER catalyst already deposited on the support material. In a further example, the OER catalyst and the hydrogen oxidation catalyst may be blended with one another and then supported on a support material. This may result in both the OER catalyst and the hydrogen oxidation catalyst being supported on the support material. However, the two catalysts may also be present in supported form independently of one another on the same or different support materials. It is also possible for one of the catalysts to be present on the respective other catalyst. The final structure depends on the mixing ratios and quantity ratios of the employed catalysts.

We also provide a membrane electrode arrangement, a water electrolysis cell and a fuel cell. These contain the first and/or second anode as described above and on account of the OER catalyst present in the anode likewise feature a particularly good and enduringly high power density, not least on account of a reduced tendency for corrosion. Resistance to hydrogen reduction even under conditions of startup/shutdown cycles and tolerance to cell reversal even under fuel starvation are exceptionally high.

We also provide a process of producing an oxygen evolution reaction catalyst. The process initially comprises a step a) of heat treating at least one iridium compound precursor at a temperature of at least 650° C. in the presence of oxygen or an oxygen source to obtain an iridium oxide-containing compound. An iridium compound precursor means a compound that under the specified process conditions, i.e., at a temperature of at least 650° C. in an oxygen-containing atmosphere, form is a really monoxide, i.e., in particular $IrO_2$. The abovementioned heat treating is performed in particular in air and converts the iridium compound precursor into a highly crystalline iridium oxide (in particular $IrO_2$) which exhibits a very high reduction stability towards hydrogen and dissolution stability.

The upper limit of the temperature used in this process step may be up to about 1100° C. However, at temperatures markedly above 1100° C. the iridium outside has a tendency for decomposition. The higher the employed temperature, the higher the energy consumption in the process and therefore temperatures of up to 750° C. are particularly advantageous having regard to a very good stability of the obtained iridium oxide at the lowest possible energy cost.

The abovementioned heat treating causes marked agglomeration of the iridium oxide formed and so the catalytic activity of the OER catalyst is markedly reduced due to the reduction of the catalytic surface area. The process accordingly provides a further process step b) of grinding the iridium oxide-containing compound. The grinding increases the BET specific surface area of the iridium oxide, thus markedly increasing the catalytic activity of the solid solution. Suitable apparatuses for performing the grinding include those which produce a particle size of in particular less than 100 nm such as, for example, grinding media mills. These include, for example, ball mills, stirred media mills, stirrer mills, attritors and specific roller mills.

Grinding thus restores the BET specific surface area partially lost during the first heat treating. Surprisingly and unexpectedly, the grinding operation does not destroy the crystal structure, which would reduce catalyst ability, but instead the stability of the catalyst remains substantially unchanged.

The subsequent step c) of heat treating makes it possible to still further improve the reduction stability towards hydrogen. It is thought that this is due to the iridium dioxide being very highly comminuted in the second heat treating step. This renewed heat treating of the ground iridium dioxide-containing compound is performed at a temperature of 250° C. to 500° C. Agglomeration or caking no longer occurs after grinding and therefore the relatively moderate temperatures in this third process step can once more markedly increase the reduction stability towards hydrogen without sacrificing catalytic surface area.

The heat treating in step a) is performed at a temperature of at least 650° C., in particular of more than 700° C. and in particular of more than 750° C. This results in an OER catalyst having still higher hydrogen reduction stability coupled with very good catalytic performance. The resulting oxygen evolution reaction catalyst exhibits a weight loss of less than 1% by weight upon exposure of the oxygen evolution reaction catalyst to a 3.3 vol % hydrogen stream in argon at a temperature of 80° C. for 12 hours and in particular has a BET specific surface area of more than 15 m²/g. The maximum operating temperature in process step a) is just below the decomposition temperature of iridium oxide and is thus about 1100° C.

To obtain a very good crystallinity of the iridium oxide the heat treating in step a) is preferably performed for a duration of more than 30 minutes and in particular of more than 60 minutes.

To achieve a highest possible degree of grinding and thus a particularly high BET specific surface area of more than 25 $m^2/g$ and in particular more than 30 $m^2/g$ the grinding in step b) is advantageously performed for a duration of more than 15 minutes and in particular of more than 40 minutes. The degree of grinding and thus the upper limit of the BET-specific surface area of the oxygen evolution reaction catalyst is not specifically limited but is preferably not more than 150 $m^2/g$ for reasons of simplified production of such a surface area.

A very high degree of grinding at minimum grinding time is obtained by grinding a in step b) using a high-energy planetary mill.

Further advantageously, the heat treating in step c) is performed at a temperature of 350° C. to 450° C. to control the hydrogen reduction stability.

In this regard it is further advantageous to perform the heat treating in step c) for a duration of 5 to 60 minutes and in particular of 15 to 30 minutes.

It is still further advantageous when the iridium compound precursor comprises an oxide of iridium and/or a chloride of iridium and/or a hydroxide of iridium and/or an oxyhydride of iridium having the formula $IrOx(OH)y$, wherein $0<2x+y\leq6$. The iridium compound precursors may carry water of crystallization. Examples of well-suited iridium compound precursors include, for example, $IrO_x$ (this may be, for example, a fixed oxide of $Ir_2O_3$ and $IrO_2$ or other iridium oxides), $IrO_x(OH)ynH_2O$, $IrCl_3$, $IrCl_3nH_2O$, $Ir(OH)_3$ and $H_2IrCl_6$. The abovementioned compounds are very easily convertible into iridium oxide (and in particular $IrO_2$) via a heat treating such as is specified in step a).

The process further advantageously comprises a step of supporting the oxygen evolutionary action catalyst on a support material, wherein the support material is in particular a carbon-based support material and especially graphitized carbon or acetylene-based carbon. The step of supporting is performed in particular during or after performance of process step b).

We also provide for the use of an oxygen evolution reaction catalyst, wherein the oxygen evolution reaction catalyst comprises iridium oxide and exhibits a weight loss of less than 1% by weight upon exposure of the oxygen evolution reaction catalyst to a 3.3 vol % hydrogen stream in argon at a temperature of 80° C. for 12 hours. The use provides for the use of the OER catalyst in an anode for a fuel cell.

FIG. 1 shows in detail two different processes of producing $IrO_2$-based OER catalysts. Route A shows a conventional process where typically an iridium precursor 1 ($IrO_x$ or $IrO_x(OH)y$) is heated in an oxygen atmosphere to a temperature in a range from 350° C. to 500° C. The very low temperature is used to try to maintain the high BET specific surface area. However, the OER catalyst 2 obtained according to route A in no way features a sufficiently high reduction stability towards hydrogen.

Route B represents a process according to one example. In process step a) an iridium compound precursor 1 (for example, $IrO_x$ or $IrO_x(OH)y$) is heated to a temperature from at least 650° C. to 1100° C. in an oxygen-containing atmosphere, for example, air. This affords stable $IrO_2$ crystallites 3. This is followed by a step b) of grinding to produce a high BET specific surface of the $IrO_2$. The ground $IrO_2$ particles having a high (more than 15 $m^2/g$) BET specific surface area 4 are subsequently in process step c) subjected to renewed heat treating at a temperature of 250° C. to 500° C. This forms the OER catalyst 5 which features very good reduction stability and very high catalytic activity. Process step c) may optionally also be preceded by a process step b2) of supporting on a suitable, usually carbon-based, support material. This affords $IrO_2$ particles supported on a support material 6 from which, according to process step c), a supported OER catalyst 7 is formed which likewise features very good reduction stability and very high catalytic activity.

EXAMPLES

To elucidate the properties of the OER catalyst the following OER catalysts were produced and characterized as specified below, wherein in the characterization reference is made to the accompanying figures and the description thereof.

Example 1: Production of OER Catalysts with High Stability Towards Reduction by Hydrogen and High BET Specific Surface Area OER catalysts having a high BET specific surface area were obtained by the following steps:

i) Initially iridium compound precursors in the form of hydrated iridium oxide of formula $IrO_x \cdot nH_2O$ ($0<2x+y\leq6$; wherein y=0) were provided ((a mixed oxide of $Ir_2O_3$ and $IrO_2$ or of other iridium oxides may be concerned).

ii) The iridium compound precursors were subjected to a high temperature treatment.

iii) The obtained compound was ground with a ball mill (ball mill with $ZrO_2$ grinding balls of 1 mm diameter as grinding bodies).

iv) Finally, a further temperature treatment was performed to obtain the final OER catalyst.

The high temperature treatment in step ii) was performed at a temperature of 650° C. to 1000° C. in air for different durations of 2 to 10 hours.

The crystal structure reconstruction and the growth of $IrO_2$ crystal domains at high temperature (step ii)) increased the stability of the heat treated $IrO_2$ proportionally to the temperature in step ii) (see also FIG. 2). However, as is apparent from Table 1 below (see samples S3-S5 which were heat treated (step ii) but not ground using a ball mill (step iii)), the BET specific surface area of the heat treated $IrO_2$ samples was drastically reduced relative to the heat treated samples. Therefore step iii), which made it possible to increase the BET specific surface area of the OER catalyst, was performed.

Figure 3:
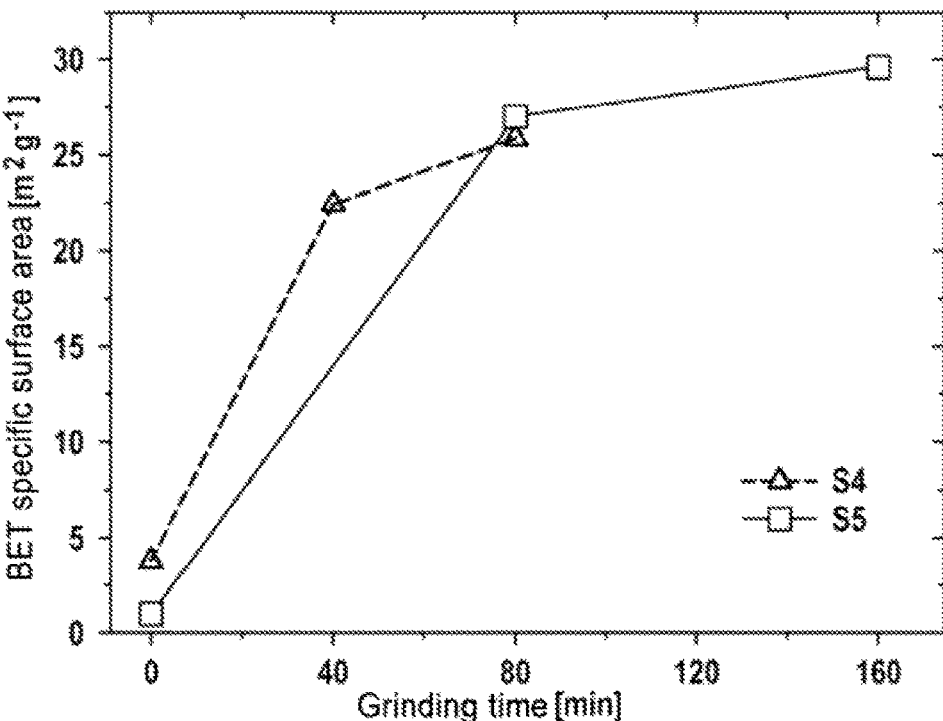
FIG. 3 shows test results elucidating the effect of the grinding in process step b).

In step (iii) the heat treated $IrO_2$ material obtained in step ii) was ground by grinding a viscous paste consisting of $IrO_2$ powder with $ZrO_2$ balls and water in a grinding vessel made of $ZrO_2$ of a planetary ball mill to obtain a BET specific surface area of about 22 to 30 $m^2/g$ based on $m^2_{IrO2}/g_{IrO2}$. The effect of the grinding is shown in FIG. 3.

Figure 4:
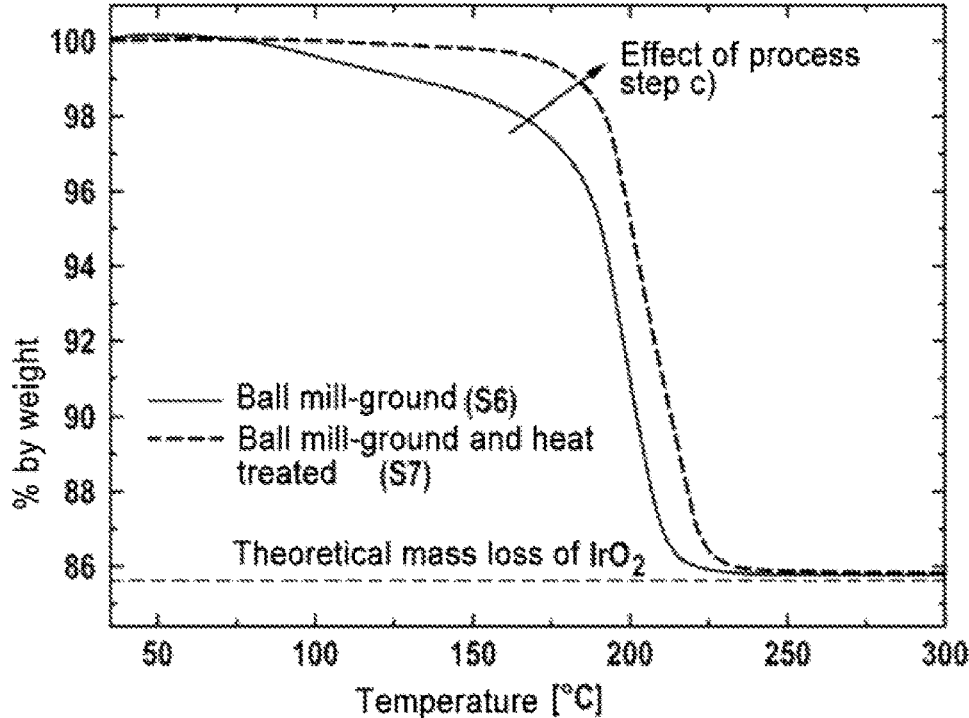
FIG. 4 shows test results elucidating the effect of the heat treating in step c).

The obtained ground samples were subsequently subjected to renewed heat treatment in step iv) at a temperature of 350° C. to 450° C. for 5 to 30 minutes to obtain the ultimate high BET specific surface area and reduction-stable $IrO_2$ crystals. The effect of step iv) (corresponds to process step c) from the process claims) on the stability of ball mill-ground $IrO_2$ in a reductive atmosphere is shown in FIG. 4.

Different $IrO_2$ samples were produced with different synthesis parameters in steps (ii) to (iv). Table 1 summarizes the corresponding parameters of these samples.

Comparative Example 1: Production of an OER Catalyst without Grinding (Step iii)

Further $IrO_2$ catalysts were obtained by heat treatment (step ii)) of $IrO_x \cdot nH_2O$ to test their performance relative to the OER catalysts from Example 1:

Sample S1: $IrO_x \cdot nH_2O$ ($0<2x+y\leq6$; in this example y=0) was heat treated at 500° C. for 2 hours in air. Before grinding, this sample had a higher BET specific surface area than the OER catalysts from Example 1. A high OER catalytic activity was thus also expected. However reduction stability towards a reductive atmosphere was not sufficient for use as a PEMFC anode. It is apparent from FIG. 5 that both the temperature ramp experiment and the isothermally performed experiment lead to poorer results for sample S1 than for the OER catalysts according to Example 1. It is thought that this is due to larger $IrO_2$ crystal domains being obtained in Example 1 than for Comparative Example 1, though all samples had approximately comparable BET specific surface areas.

Sample S2: $IrO_x \cdot nH_2O$ ($0<2x+y\leq6$; in this example y=0) was heat treated at 550° C. for 2 hours in air. Before grinding, this sample had a higher BET specific surface area than the OER catalysts from Example 1. A high OER catalytic activity was thus also expected. However reduction stability towards a reductive atmosphere was not sufficient for use as a PEMFC anode.

Samples S4 and S5: $IrO_x \cdot nH_2O$ was heat treated in air at 650° C. (S3), 750° C. (S4), and 1000° C. (S5) for 2 hours. Samples S4 and S5 showed a comparable reduction stability in a reductive atmosphere compared to the catalysts from Example 1 (see FIG. 5a). However, due to the lower BET specific surface areas samples S3 to S5 were not suitable for catalytic applications.

Comparative Example 2 ($IrO_2/TiO_2$ Comprising 75% by Weight Ir, Elyst Ir75 0480, Umicore, Germany)

A conventional, commercially available $IrO_2$-based OER catalyst supported on $TiO_2$ ($IrO_2/TiO_2$ comprising 75% by weight Ir, Elyst Ir75 0480, Umicore, Germany) was used as a comparative catalyst for comparison with the OER catalysts from Example 1. This catalyst had a BET specific surface area comparable to that of the OER catalysts from Example 1. A high catalytic activity was therefore expected. However, for this catalyst too the reduction stability in a reductive atmosphere was too low for use in a PEMFC anode. It is apparent from FIGS. 5a and 5b that both the temperature ramp experiment and the isothermally performed experiment lead to poorer results for Comparative Example 2 ($IrO_2/TiO_2$ (Umicore)) than for the OER catalysts according to Example 1.

Table 1 below provides an overview of the experiments performed:

TABLE 1

| Sample name | Temperature and time in heat treatment step ii) [° C.]-[h] | Grinding time [min] (step iii)) | Temperature and time in heat treatment step iv) [° C.]-[min] | BET specific surface area [m²/g] | Weight loss after 12 h TGA at 80° C. in 3.3 vol % $H_2$ [% by wt.] |
|---|---|---|---|---|---|
| $IrO_2/TiO_2$ (Umicore; $TiO_2$ support material), comparative example 2 | — | — | — | 27.2 | 3.96 |
| $IrO_x \bullet nH_2O$ | — | — | — | 89.4 | N/A |
| S1 | 500-2 | — | — | 26.4 | 1.36 |
| S2 | 550-2 | — | — | 22.6 | N/A |
| S3 | 650-2 | — | — | 9.7 | N/A |
| S4 | 750-2 | — | — | 3.8 | N/A |
| S5 | 1000-2 | — | — | 1.0 | N/A |
| S6 | 1000-2 | 80 | — | 27.0 | N/A |
| S7 | 1000-2 | 80 | 420-15 | N/A | N/A |
| S8 | 650-2 | 80 | 400-15 | 30.7 | 0.45 |
| S9 | 750-2 | 80 | 350-15 | 24.5 | 0.35 |
| S10 | 750-2 | 80 | 400-15 | 23.7 | N/A |
| S11 | 750-2 | 80 | 420-15 | 22.2 | N/A |
| S12 | 1000-2 | 160 | 400-15 | 26.5 | 0.35 |

The reduction stability of our catalyst was determined by measurement of the mass loss/weight loss of the OER catalyst according to the modes set out below (temperature ramp experiment and isothermal mode) using a hydrogen flow at elevated temperature. To this end, the thermogravimetric analysis (TGA) was performed in a reductive atmosphere. The thermogravimetric analysis of the OER catalyst powder was performed using a Mettler Toledo TGA/DSC 1 apparatus. About 10 to 12 mg of the OER catalyst powder were placed in a corundum crucible (volume: 70 µL) and sealed with a perforated corundum lid and placed directly in the TGA furnace. All gases used in the thermogravimetric analysis were of 5.0 purity and obtainable from Westfalen AG. Argon (20 mLmin$^{-1}$) was used as a cell carrier gas in addition to hydrogen.

Each TGA measurement is divided into the following steps:

i) an in-situ drying step in oxidizing atmosphere, and ii) a metal oxide reduction step in a reducing atmosphere.

The in-situ drying step was used to desorb all water molecules and organic molecules adsorbed on the surface of the OER catalyst powder to ensure that the weight loss in step ii) is due only to the reduction of iridium oxide.

The in-situ drying step was performed as follows: initially the TGA furnace was purged with argon for 5 min at a temperature of 25° C. (100 mLmin$^{-1}$), subsequently the temperature was increased from 25° C. to 200° C. (10 Kmin$^{-1}$) in O$_2$ (100 mLmin$^{-1}$). The temperature of 200° C. was held for 10 min in O$_2$ (100 mLmin$^{-1}$). The furnace was then cooled from 200° C. to 25° C. (−10 Kmin$^{-1}$) in O$_2$ (100 mLmin$^{-1}$) and finally the TGA furnace was purged with argon (100 mLmin$^{-1}$) for 5 min at 25° C.

The metal oxide reduction step was performed according to two different modes: a) a temperature ramp mode and b) an isothermal mode.

During performance of the step in temperature ramp mode the temperature of the furnace was increased from 25° C. to 500° C. at a heating rate of 5 Kmin$^{-1}$ in 3.3 vol % H$_2$/Ar (40 mLmin$^{-1}$) followed by a cooling of the furnace from 500° C. to 25° C. (cooling rate: −20 K$^{-1}$) in argon (100 mL min$^{-1}$).

During performance of the step in the isothermal mode the furnace was heated from 25° C. to 80° C. at a heating rate of 5 Kmin$^{-1}$ in argon (100 mLmin$^{-1}$) followed by gas switchover to 3.3 vol % H$_2$/Ar (40 mLmin$^{-1}$) and held at 80° C. for 12 hours. Thereafter the furnace was cooled from 80° C. to 25° C. (cooling rate: −20 km$^{-1}$) in Ar (100 mLmin$^{-1}$).

The BET surface area was determined using a Quantachrome Autosorb iQ instrument. The samples are degassed overnight at 120° C. and the N$_2$-Adsorption was measured at 77 K. The specific surface area (BET specific surface area) was determined according to Brunauer-Emmett-Teller (BET) theory using "mircopore BET assistant" of the software AsiQwin.

The weight loss during the TGA experiment was attributable to the reduction of IrO$_2$ to metallic Ir by H$_2$ according to the following reactions: IrO$_2$(s)+2H$_2$(g)→Ir(s)+2H$_2$O(g).

It was demonstrated that the heat treatment in step a) of our process markedly increased the stability of the obtained OER catalyst towards reduction by hydrogen.

CCM Production

Anode catalyst layers were produced by mixing a 20% by weight Pt/C catalyst with an iridium oxide-based OER catalyst in a water/solvent medium together with a perfluorosulfonic acid (PFSA) ionomer binder to obtain a dispersion. The Pt to Ir ratio was adjusted to 1:1 (on a % by weight basis) for all samples. The catalyst dispersions were carefully ground for 120 minutes using a ball mill with ZrO$_2$ grinding balls of 1 mm diameter as grinding bodies.

Anode electrode layers were formed using a knife coating machine and dried on a fluorinated substrate film. The height of the coating knife was adjusted to give a loading of 0.05 mg Pt/cm$^2$ and 0.05 mg Ir/cm$^2$.

An anode without iridium was also produced and used as a reference example for the SUSD test performed (see Reference Example in Table 2). The Pt loading was likewise 0.05 mg Pt/cm$^2$.

Catalyst coated membranes (CCMs) were then produced using a decal process (standard decal transfer process), wherein a 15 µm thick PFSA ionomer membrane was arranged between an anode layer and a cathode layer opposite the anode layer. The cathode electrode layer comprised a catalyst of 50% by weight Pt/C and had a Pt loading of 0.30 mg Pt/cm$^2$. The active area of both catalyst layers was 71 mm×62 mm and the membrane size was 110 mm×110 mm. Table 2 summarizes the CCM compositions.

Fuel Cell Test

Electrochemical tests were performed using a 38 cm$^2$ PEM single cell fitted with graphitized serpentine flow plates. The single cell was under thermal control, wherein heat-resistant heating plates were used for heating and a ventilator was used for air cooling. The gases were humidified using a bubbler. The single cell was run in countercurrent. The CCM was provided with carbon-based gas diffusion layers on both sides of the membrane electrode units (MEAs). All MEA samples were fitted with non-compressible glass fiber reinforced PTFE seals, thus resulting in a 10 vol % compression of the GDL. Prior to performing the performance tests on the MEA samples, the single cell was conditioned under hydrogen/air for 8 hours at 1 A/cm$^2$ and a pressure of 1.5 bar$_{abs}$. The temperature of the single cell T$_{cell}$ was 80° C. and the humidifier temperatures were 80° C. (anode) and 80° C. (cathode).

Hydrogen/air IV polarization measurements were performed at the beginning of life (BOL), during the startup/shutdown cycle test and at the end of test (EOT), specifically under the following conditions: T$_{cell}$=80° C., humidifier temperature=80° C. (both sides), pressure=1.5 bar$_{abs}$, anode stoichiometry=1.5, cathode stoichiometry=2.

Startup/Shutdown Cycle Test (SUSD)

SUSD cycles were simulated in a gas exchange experiment with defined residence times of the hydrogen/air front. The anode side of the single cell was equipped with three-way valves that allowed switching between dry air and humidified hydrogen. To simulate startup the anode flow field was initially filled with dry air which was then replaced with humidified hydrogen to form an H$_2$/air front. By contrast, during shutdown the anode flow field filled with humidified hydrogen was purged with dry air to form an air/H$_2$ front.

Operating conditions were kept constant in both compartments during the SUSD experiments (1.01 bar$_{abs}$, outlet and 100% relative humidity RH). The residence time of the H$_2$/air front in the single cell was defined as the flow field volume (cm$^3$) divided by the volume flow of humidified gas under SUSD conditions (35° C. and 1.01 bar$_{abs}$, outlet) and was set at 0.3 seconds. The time between startup and shutdown was set to 55 seconds. Polarization curves were recorded immediately after conditioning of the MEA and after each set of 10, 40, 50, 100 and 300 SUSD cycles to observe the voltage loss at a reference condition of 80° C.

During the SUSD tests the anode oscillated between hydrogen and air potentials and was thus exposed to alternating reducing and oxidizing conditions. Under the prevailing conditions when the OER catalyst was unstable the iridium oxide had a tendency to be reduced, to dissolve and to migrate to the cathode side. This was consistent with an observed progressive reduction in the performance of the MEA, wherein the performance loss for the reference example containing no iridium-based OER catalyst was smaller.

TABLE 2

| Cathode | Cathode Pt loading [mg cm$^{-2}$] | Anode Pt/C catalyst | Anode OER catalyst | Anode Pt loading [mg cm$^{-2}$] | Anode Ir loading [mg cm$^{-2}$] |
|---|---|---|---|---|---|
| Example 2 | 50% by wt. Pt/C | 0.30 | 20% by wt. PU/C | S11 | 0.05 | 0.05 |
| Example 3 | 50% by wt. Pt/C | 0.30 | 20% by wt. Pt/C | S12 | 0.05 | 0.05 |
| Comparative Example 3 | 50% by wt. Pt/C | 0.30 | 20% by wt. Pt/C | S1 | 0.05 | 0.05 |
| Comparative Example 4 | 50% by wt. Pt/C | 0.30 | 20% by wt. Pt/C | Elyst Ir75 | 0.05 | 0.05 |
| Reference Example | 50% by wt. Pt/C | 0.30 | 20% by wt. Pt/C | — | 0.05 | 0.05 |

Fuel Cell Tests

The CCMs produced above (see Table 2) were subjected to polarization performance tests and SUSD tests. The results of these tests are summarized in Table 3 below. As is apparent from Table 3 the tests of the CCMs with the unstable OER catalysts (sample S1 and Elyst Ir75 0480 Umicore) showed a greater loss than those containing the OER catalysts (samples S11 and S12). The CCM containing no OER catalyst (reference example) showed the lowest losses but had no CRT capacity. In Table 3 a negative value indicates a performance gain.

TABLE 3

| Example (sample) | mV loss at 1.2 A/cm$^2$ after 100 SUSD cycles | mV loss at 1.2 A/cm$^2$ after 200 SUSD cycles |
|---|---|---|
| Example 2 (Sample S11) | 0 | 12 |
| Example 3 (Sample S12) | -2.5 | 6.5 |
| Comparative Example 3 (Sample S1) | 10 | 17 |
| Comparative Example 4 (Elyst Ir 75 0480) | 47.5 | 75 |
| Reference Example (without OER catalyst) | -11.5 | -4 |

FIG. 2 shows results of TGA temperature ramp experiments in 3.3 vol % $H_2$/Ar to elucidate the effect of heat treatment of different samples, wherein different temperatures and durations were used.

Figure 2A:
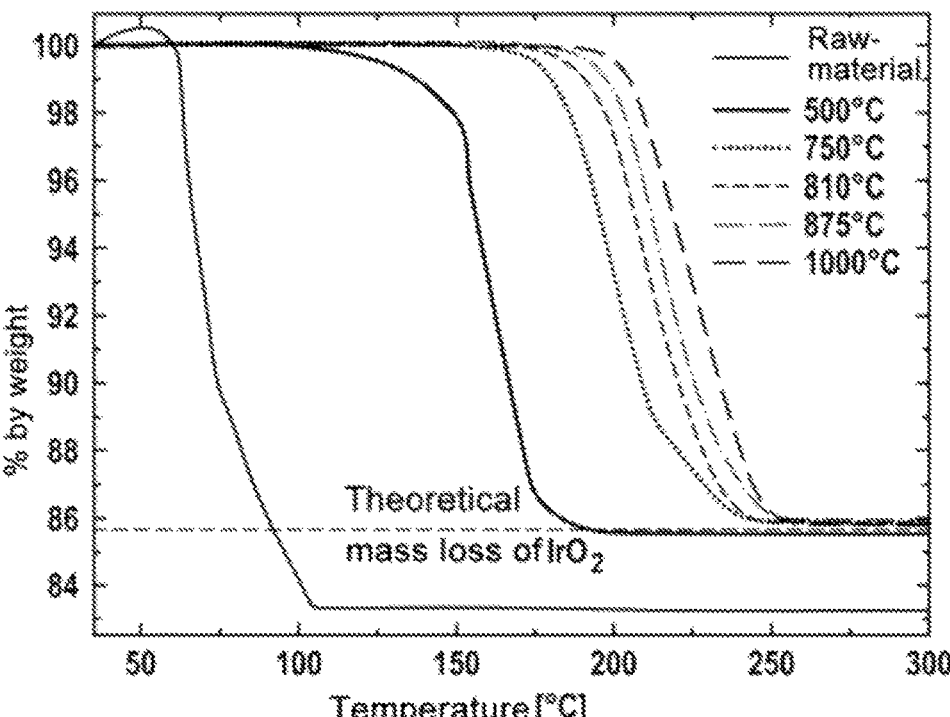
FIGS. 2a-2d show TGA ramp experiments.
Figure 2B:
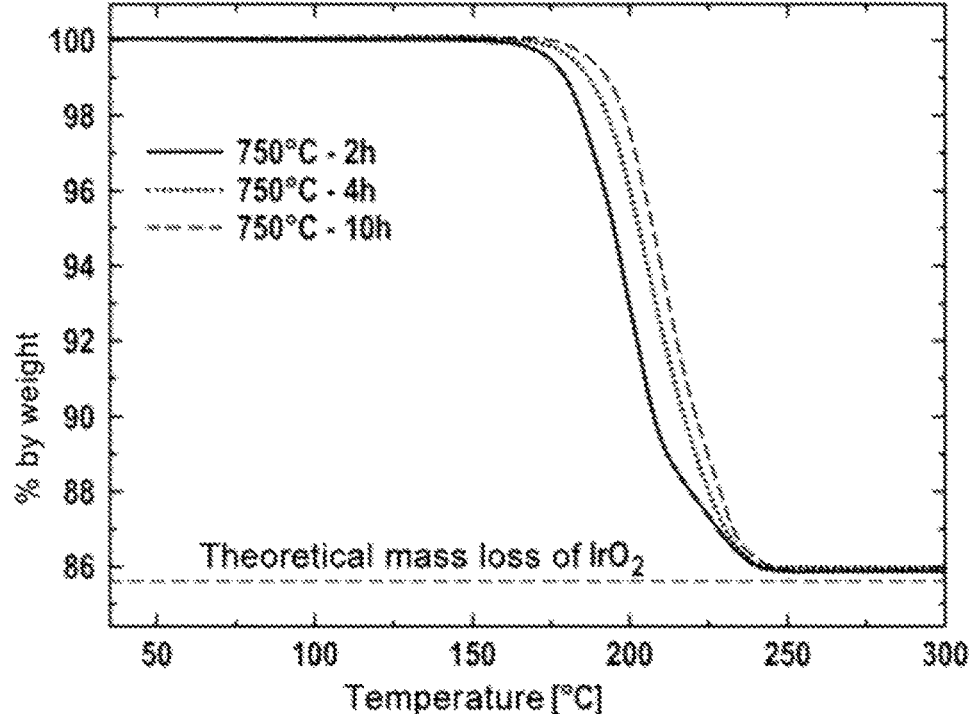
Figure 2C:
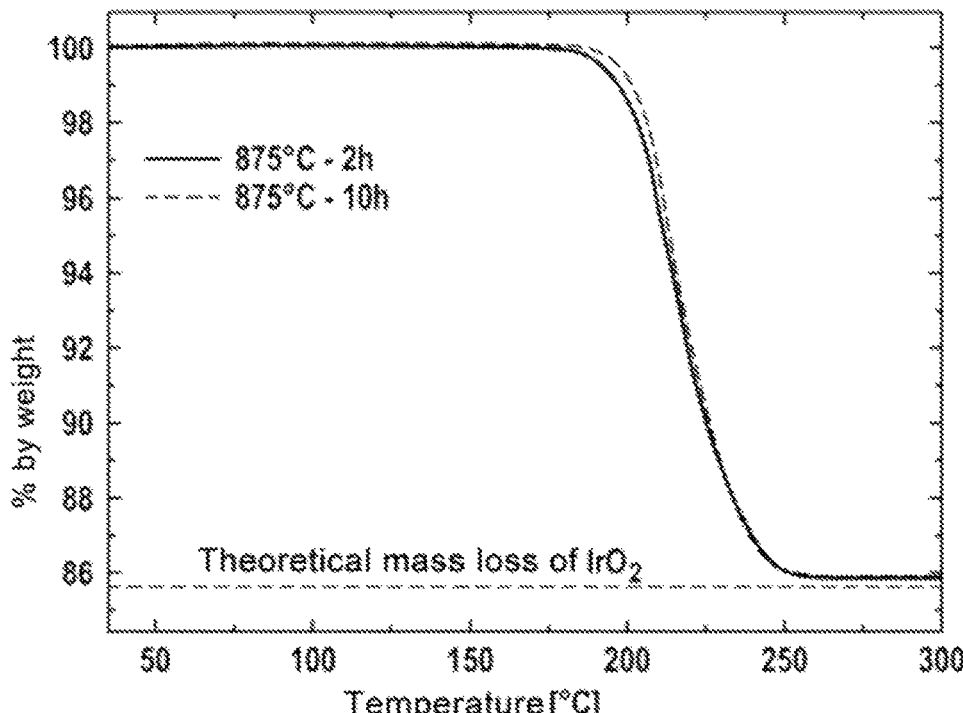
Figure 2D:
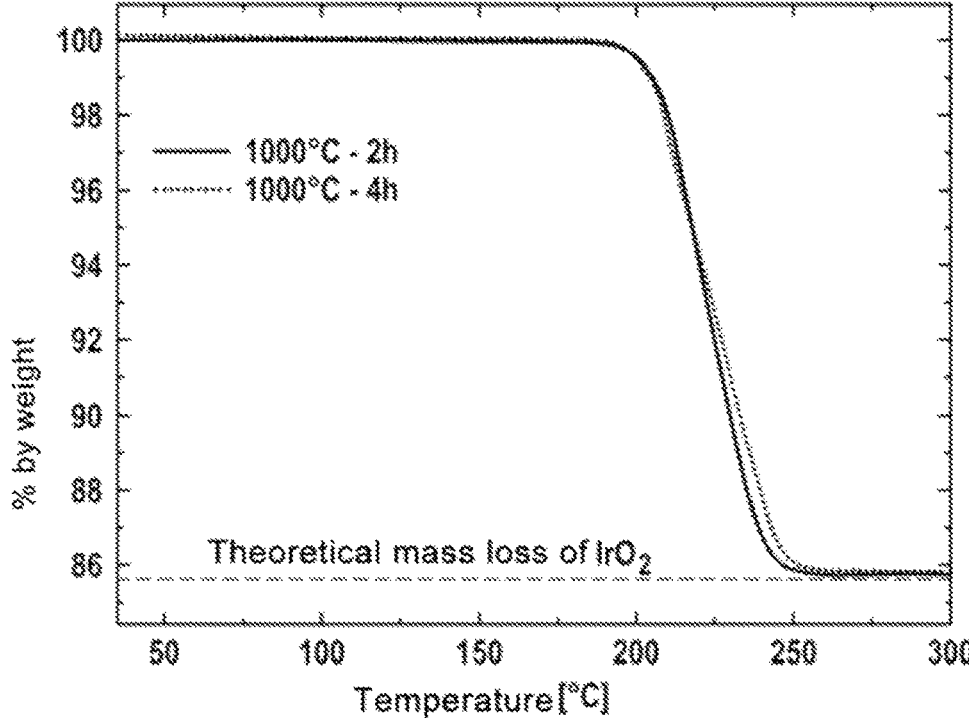

In FIG. 2a) the samples were each held for a duration of 2 hours at different temperatures. In FIGS. 2b), 2c) and 2d) the samples were held for different durations at the respective temperature (2b): 750° C., 2c): 875° C. and 2d): 1000° C.).

FIG. 3 elucidates the effect of grinding on the BET specific surface area of heat treated $IrO_2$. The BET specific surface areas are shown as a function of grinding time. In general, it is apparent from FIG. 3 that the BET specific surface area increases with the grinding time. However, above about 80 minutes of grinding time the increase is only relatively small.

FIG. 4 shows the results of TGA temperature ramp experiments in 3.3 vol % $H_2$/Ar as set out above for FIG. 2 to elucidate the effect of the second heat treatment step c) in the production of the OER catalyst. The heat treatment step c) is performed after the grinding of the iridium-containing compound. It is apparent from FIG. 4 that sample S6 which was not subjected to a heat treatment step c) was less reduction-stable towards hydrogen than sample S7 which was subjected to a heat treatment step c). It is further apparent that the weight loss for sample S6 already occurs at a temperature of less than 100° C., wherein a weight loss of sample S7 only begins at more than 150° C., which is significant for a usage temperature of the OER catalyst in, for example, an electrolysis cell or a fuel cell. The results of FIG. 4 show that a second heat treatment step c) after grinding is particularly advantageous for the desired hydrogen reduction stability.

Figure 5A:
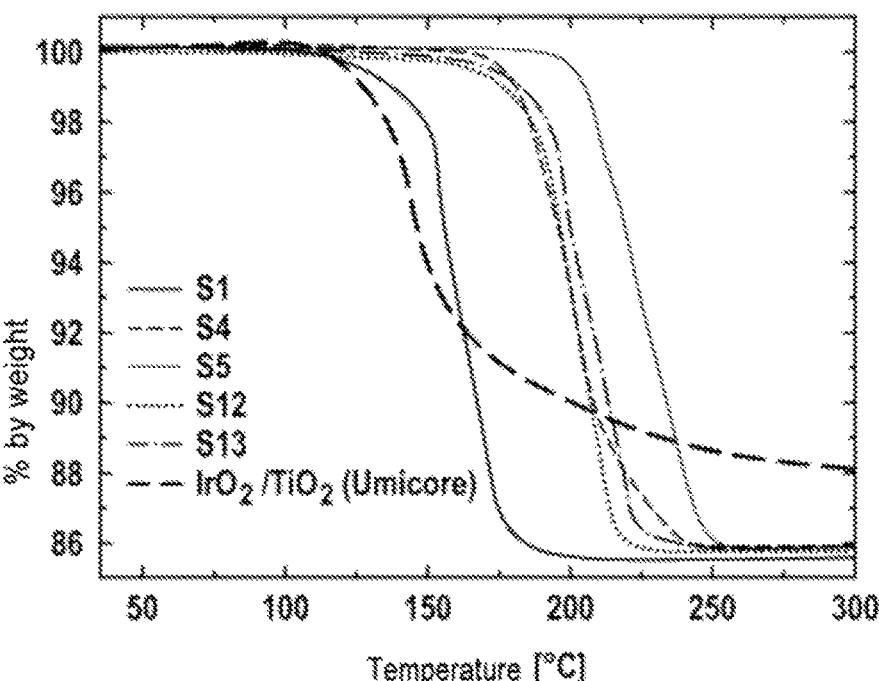
FIGS. 5a and 5b show results of metal oxide reduction tests according to the a) temperature ramp mode and b) isothermal mode.
Figure 5B:
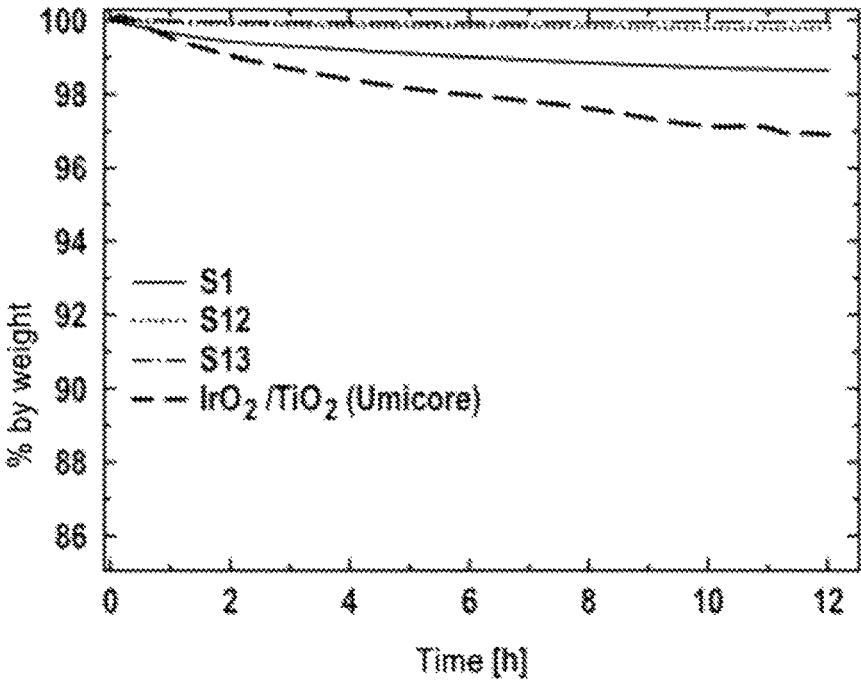

FIGS. 5a and 5b show TGA temperature ramp experiments in 3.3 vol % $H_2$/Ar to elucidate the $IrO_2$ reduction temperature (weight loss) of different samples. It is apparent from FIG. 5a that the samples produced according to Example 1 were more reduction-stable (they showed a higher reduction temperature) than the catalysts of sample S1 and $IrO_2$/$TiO_2$ (Umicore) which exhibited a similar BET specific surface area and that their stability was comparable to the heat treated samples S4 and S5 with low BET specific surface area.

FIG. 5b) shows results from isothermal TGA experiments at 80° C. in 3.3 vol % $H_2$/Ar to simulate the conditions in a PEMFC anode. It is apparent that the samples S1 and $IrO_2$/$TiO_2$ (Umicore) with high BET specific surface area showed poorer results than the examples in a chemical environment of a simulated PEMFC since the OER catalysts were reduced to metallic Ir. The OER catalysts produced according to Example 1 were significantly more reduction-stable under the simulated PEMFC anode conditions and showed essentially no weight loss during the isothermal TGA experiment.

In addition to the above written description, explicit reference is hereby made to the graphical representation in FIGS. 1 to 5 for the supplementary disclosure thereof.

The invention claimed is:

1. An oxygen evolution reaction catalyst comprising iridium oxide that exhibits a weight loss of less than 1% by weight upon exposure of the oxygen evolution reaction catalyst to a 3.3 vol % hydrogen stream in argon at a temperature of 80° C. for 12 hours and has a BET specific surface area of more than 15 m²/g, wherein the BET specific surface area refers to the iridium oxide included in the oxygen evolution reaction catalyst and is given in m²$_{Iridiumoxid}$/g$_{Iridiumoxid}$.

2. The oxygen evolution reaction catalyst as claimed in claim 1, wherein the oxygen evolution reaction catalyst is supported on a support material, and the support material is a carbon-based support material or graphitized carbon.

3. An anode for an electrochemical cell comprising the oxygen evolution reaction catalyst as claimed in claim 1.

4. A water electrolysis cell comprising the anode as claimed in claim 3.

5. A process of producing the oxygen evolution reaction catalyst as claimed in claim 1, comprising:
   a) heat treating at least one iridium compound precursor at a temperature of at least 650° C. in the presence of oxygen or an oxygen source to obtain an iridium oxide-containing compound,
   b) grinding the iridium oxide-containing compound, and
   c) heat treating the ground iridium oxide-containing compound at a temperature of 250° C. to 500° C.

6. The process as claimed in claim 5, wherein the heat treating in step a) is performed at a temperature of more than 700° C. and/or the heat treating in step a) is performed for a duration of more than 30 minutes and/or the grinding in step b) is performed for a duration of more than 15 minutes and/or the grinding in step b) is performed using a high-energy planetary mill and/or the heat treating in step c) is performed for a duration of 5 to 60 minutes and/or the iridium compound precursor comprises: an oxide of iridium and/or a chloride of iridium and/or a hydroxide of iridium and/or an oxyhydride of iridium having the formula $IrO_x(OH)_y$, wherein x and y are integers and $0<2x+y\leq6$, and the iridium compound precursor may carry water of crystallization, and further comprising a step of supporting the oxygen evolution reaction catalyst on a support material, and the support material is a carbon-based support material or graphitized carbon.

7. An anode for a fuel cell comprising an oxygen evolution reaction catalyst, wherein the oxygen evolution reaction catalyst comprises iridium oxide and exhibits a weight loss of less than 1% by weight upon exposure of the oxygen evolution reaction catalyst to a 3.3 vol % hydrogen stream in argon at a temperature of 80° C. for 12 hours.

8. The anode as claimed in claim 7, further comprising at least one hydrogen oxidation catalyst or a platinum-based hydrogen oxidation catalyst.

9. The anode as claimed in claim 8, wherein the hydrogen oxidation catalyst is supported on a support material and/or on the oxygen evolution reaction catalyst, and the support material is a carbon-based support material or graphitized carbon.

10. A membrane electrode assembly comprising the anode as claimed in claim 7.

11. A fuel cell comprising the anode as claimed in claim 7.

* * * * *